(12) United States Patent
Faivre et al.

(10) Patent No.: US 7,167,800 B2
(45) Date of Patent: Jan. 23, 2007

(54) METHOD OF OPTIMIZING REMOTE SENSING OPERATION TIMING

(75) Inventors: Stephen Michael Faivre, Kingston, IL (US); Mark William Stelford, Sycamore, IL (US)

(73) Assignee: Deere & Company, Moline, IL (US)

( * ) Notice: Subject to any disclaimer, the term of this patent is extended or adjusted under 35 U.S.C. 154(b) by 51 days.

(21) Appl. No.: 11/104,002

(22) Filed: Apr. 12, 2005

(65) Prior Publication Data

US 2006/0229814 A1    Oct. 12, 2006

(51) Int. Cl.
 *G06F 19/00* (2006.01)
 *G06Q 90/00* (2006.01)
(52) U.S. Cl. .............................. 702/3; 702/5
(58) Field of Classification Search .............. 702/2, 702/3, 5, 182, 183; 703/6, 9, 11, 12; 705/7–10; 701/50
 See application file for complete search history.

(56) References Cited

U.S. PATENT DOCUMENTS

| | | | |
|---|---|---|---|
| 4,080,906 A | 3/1978 | Brown | |
| 4,880,342 A | 11/1989 | Pradovic | |
| 4,986,706 A | 1/1991 | Williams, Jr. | |
| 4,992,942 A * | 2/1991 | Bauerle et al. | 700/284 |
| 5,244,332 A | 9/1993 | Krein et al. | |
| 5,595,315 A | 1/1997 | Podd et al. | |
| 5,884,225 A * | 3/1999 | Allen et al. | 702/3 |
| 6,206,623 B1 | 3/2001 | Podd | |
| 6,327,569 B1* | 12/2001 | Reep | 705/1 |
| 6,406,232 B1 | 6/2002 | Snitker et al. | |
| 6,789,987 B1 | 9/2004 | Langh | |
| 6,999,877 B1* | 2/2006 | Dyer et al. | 702/5 |
| 7,069,232 B1* | 6/2006 | Fox et al. | 705/10 |
| 2003/0004780 A1* | 1/2003 | Smith et al. | 705/10 |

* cited by examiner

*Primary Examiner*—Donald McElheny, Jr.

(57) ABSTRACT

Presented herein is a method for predicting suitability for performing a remote sensing operation over a particular field. The method includes the step of accessing predicted operation variables at points within the field. These operation variables may include values for weather, crop, and soil conditions. Based on operation suitability parameters selected for each variable, the method predicts remote sensing operation suitability for different points in time.

10 Claims, 6 Drawing Sheets

| Operation: Remote Sensing for Nitrogen | | | Suitabilty Parameters | | | |
|---|---|---|---|---|---|---|
| Suitabilty Parameters | Value | Stblty | Wt | 0.0 | 1.0 | 1.0 | 0.0 |
| Weather Conditions | | | | | | | |
| Wind | 10 kph | 100% | 1 | 0 | 0 | 20 | 25 |
| Precipitation | 1 mm | 50% | 1 | 0 | 0 | 0 | 2 |
| Solar Radiation | 5 hrs | 75% | 1 | 2 | 6 | 14 | 14 |
| Crop Conditions | | | | | | | |
| Vegetation Stage | 5 V | 50% | 10 | 4 | 6 | 7 | 8 |
| Soil Conditions | | | | | | | |
| Soil Moisture | 45 % | 100% | 5 | 10 | 25 | 75 | 100 |
| Overall Node Suitabilty: | | 68% | | | | | |

METHOD OF OPTIMIZING REMOTE SENSING OPERATION TIMING

FIELD OF THE INVENTION

The present invention relates to the prediction of field conditions and the suitability for performance of a remote sensing operation over the field.

BACKGROUND OF THE INVENTION

Land engaged in agriculture may subjected to a variety of remote sensing operations in order obtain more detailed information about soil and crop condition. Examples include satellite imagery, aerial imagery, and manual field scouting. Agricultural producers use this information to make operation decisions such as irrigating, fertilizing, or treating infestation. In order to optimize the timing of remote sensing operations to best capture field condition information, it is critical that these operations be performed when weather and field conditions are ideal. In order to optimize timing of remote sensing operations, a method of predicting suitable times for performing a remote sensing operation is desirable.

SUMMARY OF THE INVENTION

Presented herein is a method for predicting suitability for performing a remote sensing operation over a particular field. The method includes the step of accessing predicted operation variables at points within the field. These operation variables may include values for weather, crop, and soil conditions. Based on operation suitability parameters selected for each variable, the method predicts remote sensing operation suitability for different points in time.

BRIEF DESCRIPTION OF THE DRAWINGS

FIG. 3 illustrates a table displaying suitability values for performance of a remote sensing operation at a single field node on a single day.

FIG. 5 illustrates a graphical display of suitability values for performance of a remote sensing operation over multiple fields on a single day.

DETAILED DESCRIPTION

Figure 1:
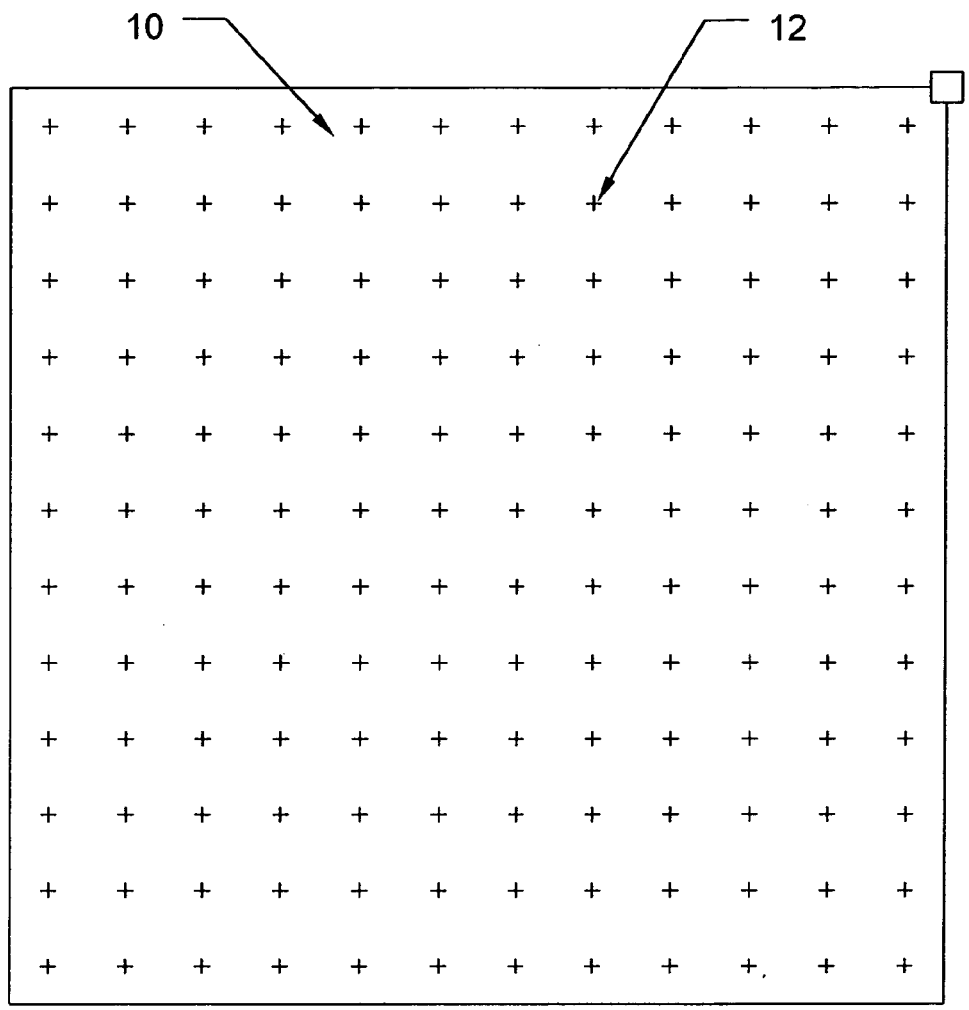
FIG. 1 illustrates a farm field having many field nodes.

FIG. 1 illustrates a parcel of land, or field 10, suitable for agricultural use, and under agricultural cultivation. As such, the field 10 may be subjected to remote sensing operations such as satellite imagery, aerial imagery, or manual field scouting. Numerous field nodes 12 dispersed throughout field 10 divide the parcel into smaller sample areas. A method presented herein predicts suitability 6 for performing remote sensing operations over the field 10 at different points in time, by comparing operation variables 8 predicted for each field node 12 against operation suitability parameters 66 selected for the remote sensing operation.

Figure 2:
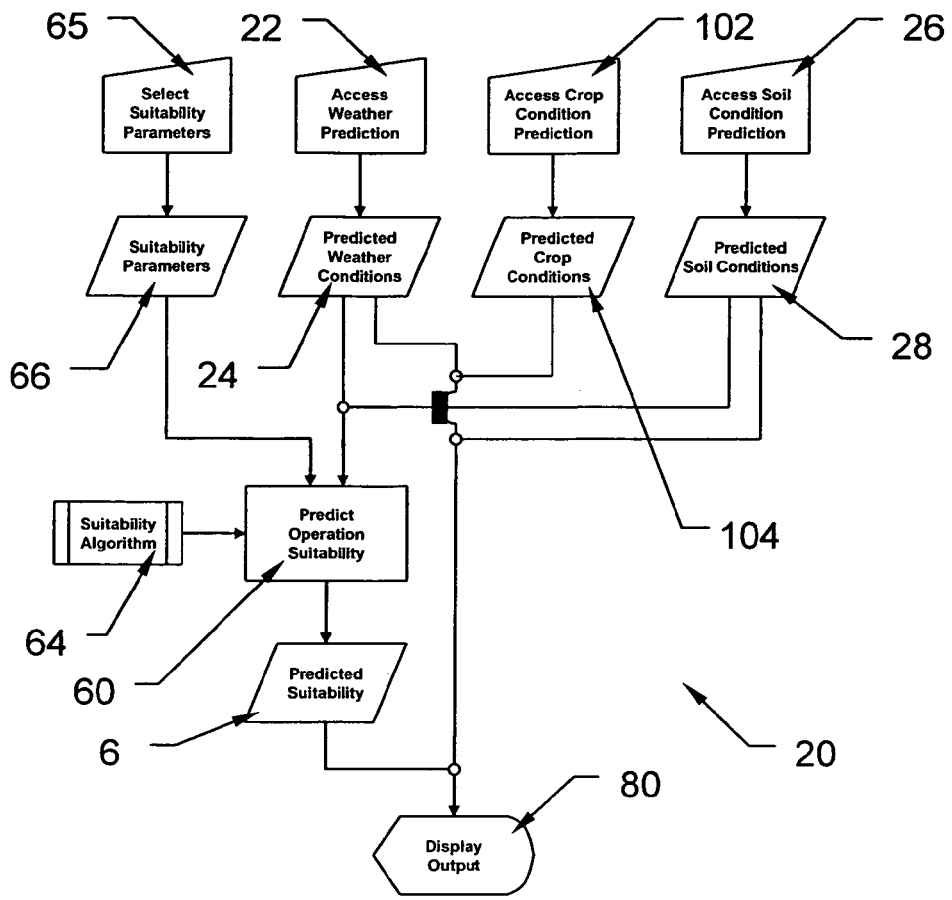
FIG. 2 illustrates an embodiment for the present invention method.

FIG. 2 illustrates an embodiment 20 of the present invention. The first step 22 in this embodiment 20 is to access values for one or more predicted operation variables 8 at the node 12. Operation variables 8 may include, but are not limited to, weather conditions 24, crop conditions 104, and soil conditions 28. Weather conditions 24 may include values for, but are not limited to, temperature, relative humidity, wind speed, precipitation, and solar radiation. Crop conditions 104 may include, but are not limited to, crop maturity level, crop stress level, vegetative stage, and pollination stage. Soil conditions 28 may include, but are not limited to, soil moisture and soil temperature.

Values for predicted weather conditions 24 at the field node can be obtained from sources such as the National Weather Service website, operated by the National Oceanic and Atmospheric Administration. Values for crop conditions 104 and soil conditions 28 may be predicted with a dynamic model, such as the Precision Agricultural-Landscape Modeling System (PALMS) developed under NASA's Regional Earth Science Application Center (RESACA) program. This program predicts crop conditions 104 and soil conditions 28, based on predicted weather conditions 24, measured soil conditions, and crop season parameters. This computer program is available under license for research or commercial use through the Wisconsin Alumni Research Foundation.

The next step 60 of this embodiment 20 is to predict remote sensing operation suitability 6 at the node 12 for several points in time by comparing predicted operation variables 8 against operation suitability parameters 66 selected for the remote sensing operation. These parameters 66 define thresholds at which the operation variable is suitable 68 for the remote sensing operation, and thresholds beyond which the variable is unsuitable 70. In the illustrated embodiment, a suitability algorithm 64 calculates suitability values for each operation variable 6 of concern, based on suitability parameters 66 selected. FIG. 3 illustrates a table 62 showing input and output for the suitability algorithm 64.

For example, if a value for an operation variable 8 at a given point in time falls within the suitable value thresholds 68, then the suitability algorithm 64 will calculate the suitability value 6' for that operation variable 8 to be 100%. Conversely, if the value for the variable 8 falls outside of the unsuitable value thresholds 70, then the suitability algorithm 64 will calculate the suitability value 6' for that operation variable 8 to be 0%. Finally, if the value for the operation variable 8 falls within the transition range between suitable and unsuitable thresholds, then the suitability algorithm 64 will calculate the suitability value 6' for that operation variable 8 to be the fraction between the suitable threshold value 68 and unsuitable threshold value 70. FIG. 3 illustrates an example, with suitability parameters 66 for solar radiation having a suitable lower threshold value of 6 hours, and an unsuitable lower threshold value of 2 hours. Thus, for the predicted solar radiation of 5 hours, the suitability value 6' for solar radiation calculates as $((6-5)/(6-2)) \times 100 = 75\%$.

As illustrated, the suitability algorithm 64 also includes weightings 72 emphasizing the relative importance of each operation variable 8 with regard to overall operation suitability 6 for the node 12. The suitability algorithm 64 calculates overall suitability 6 by multiplying each operation variable suitability value 6' by its corresponding weighting 72 for a weighted suitability value, then dividing the sum of the weighted suitability values by the sum of the weighting values 72. FIG. 3 illustrates an example of overall node suitability 6 for performance of a remote sensing operation for nitrogen, based on predicted weather conditions 24, crop conditions 104, and soil conditions 28.

Figure 4:
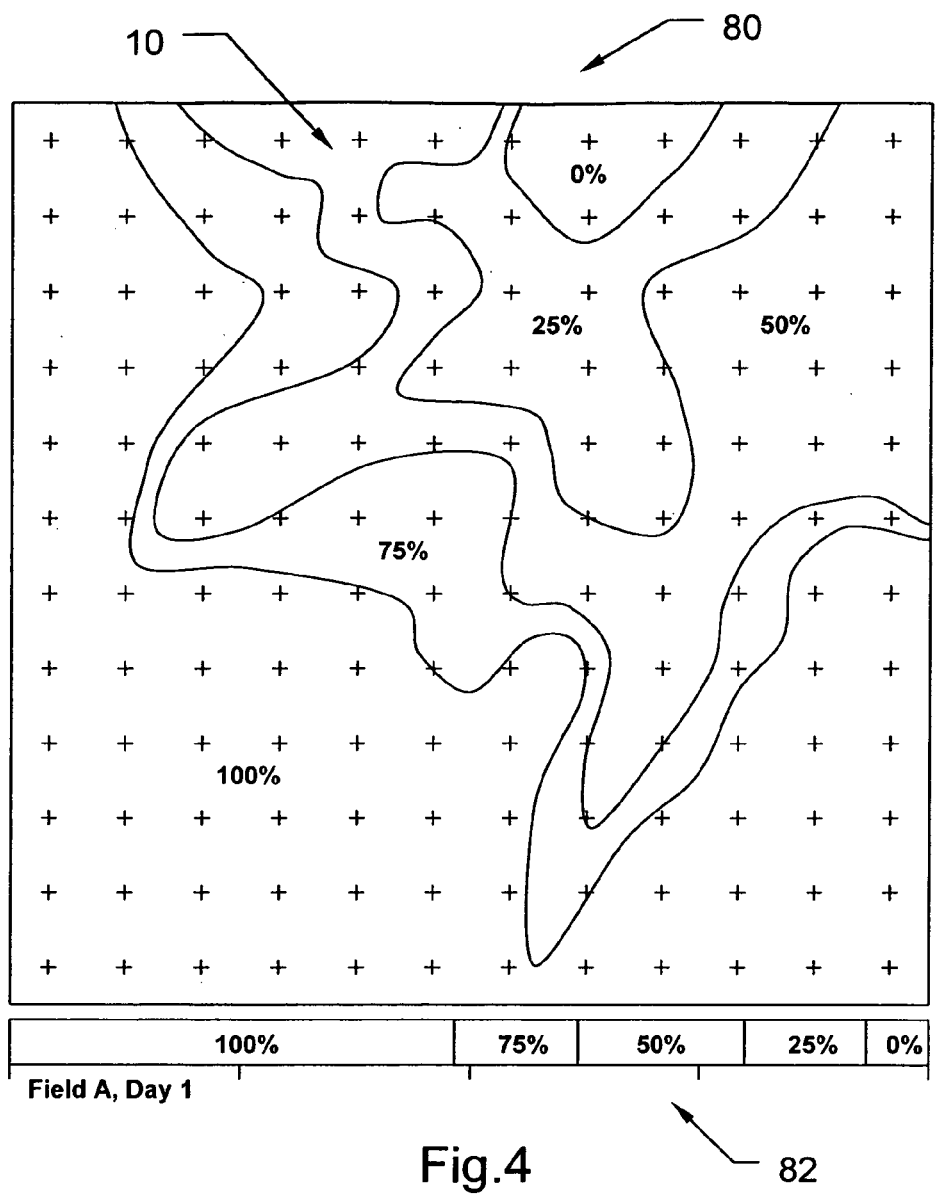
FIG. 4 illustrates a map displaying suitability values for performance of a remote sensing operation over a single field on a single day.
Figure 5:
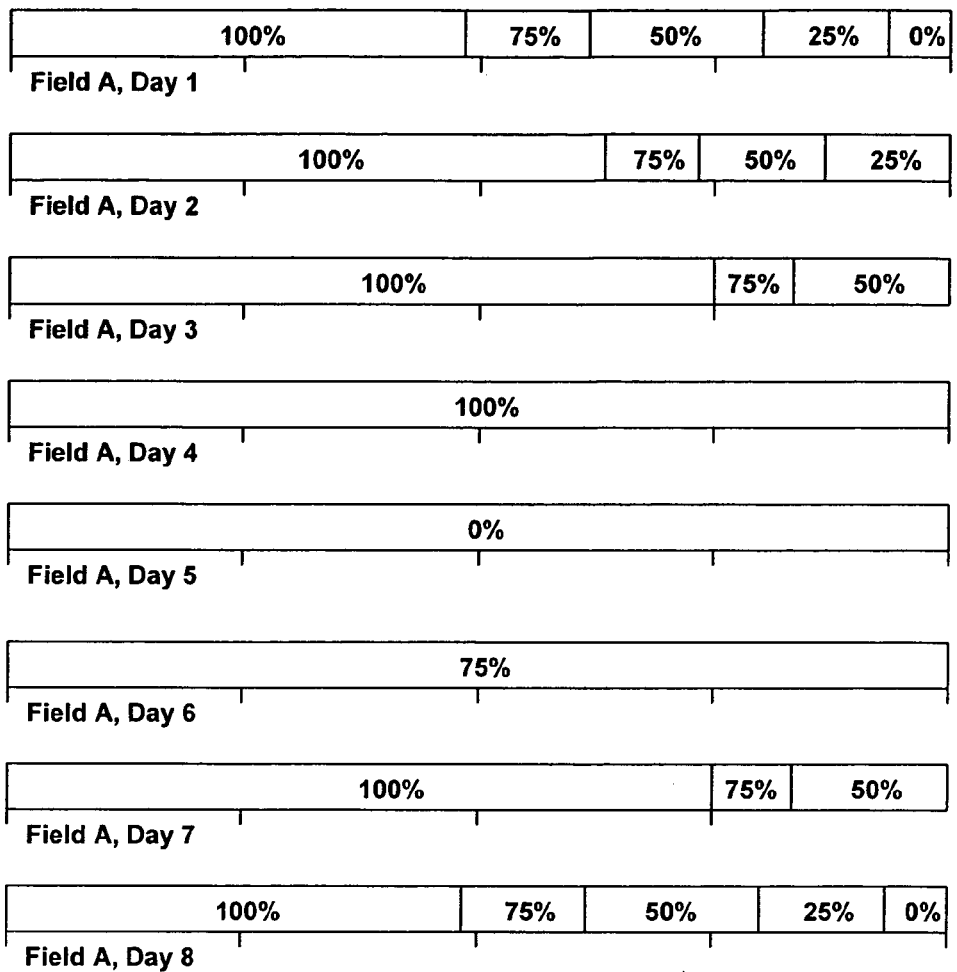
FIG. 5 illustrates a graphical display of suitability values for performance of a remote sensing operation over a single field for multiple days.
Figure 6:
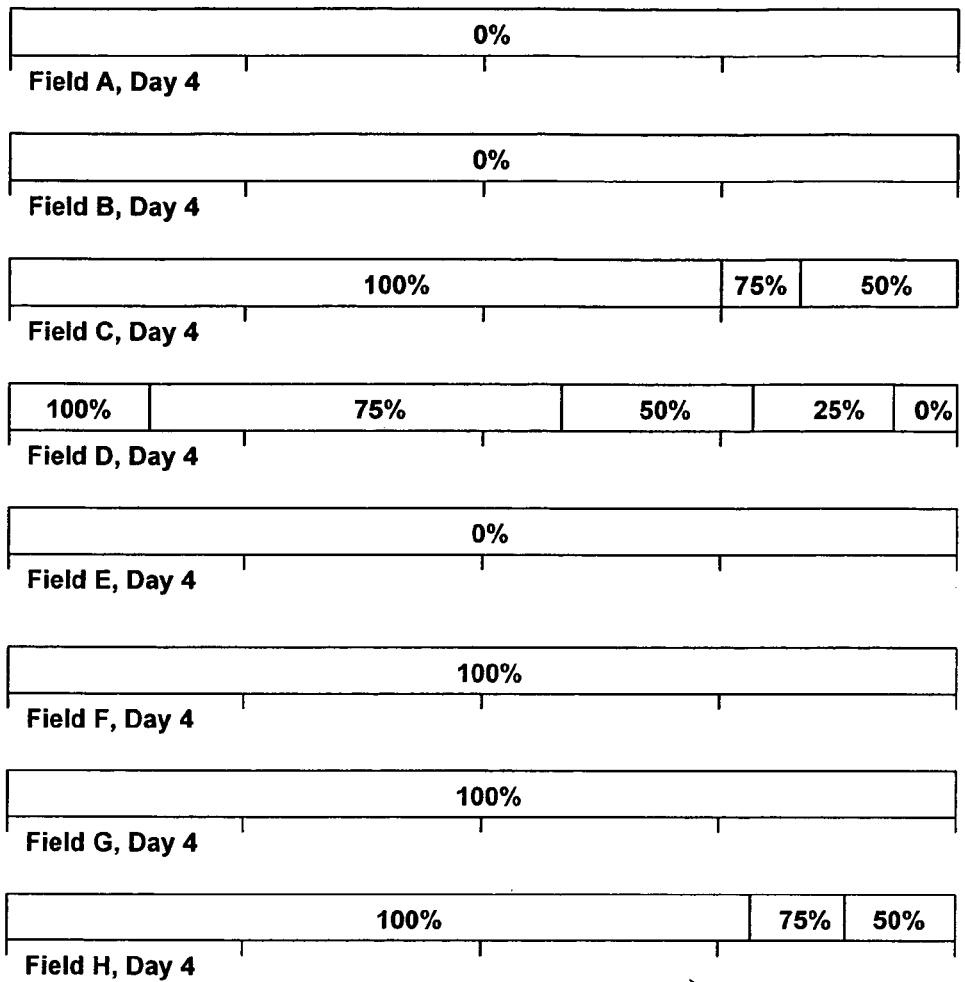

Values for operation variables 8, operation variable suitability 6', and overall node suitability 6 generated from the foregoing method are available for display 90 in numerous forms. FIG. 4 shows an example of a map display 80 showing overall node suitability 6 for a remote sensing operation over an entire farm field 10 on a single day. This figure also shows a summary of operation suitability 6 over the entire field 10 in a bar graph 82 at the bottom of the illustration. FIG. 5 shows a similar bar graph display 84 showing overall node suitability 6, but for multiple days in the same farm field 10. This display 84 is especially useful when planning the best day for performance of a remote sensing operation. Finally, FIG. 6 illustrates a bar graph display 86 showing overall node suitability 6 for multiple farm fields 10 on a single day. This display 86 is especially useful in selecting alternative fields 10 in which to perform the operation on a given day.

Having described the illustrated embodiments, it will become apparent that various modifications can be made without departing from the scope of the invention as defined in the accompanying claims.

The invention claimed is:

1. A method of predicting suitability for performance a remote sensing operation at a field node, the method comprising steps of:
   accessing predicted values for operation variables at the node for different points in time, wherein the predicted operation variables comprise a value for at least one crop condition or soil condition;
   selecting suitability parameters for each predicted operation variable;
   determining values for operation suitability at the node for different points in time using a suitability algorithm adapted to calculate suitability values by comparing predicted operation variable values against the corresponding suitability parameters;
   displaying values determined for remote sensing operation suitability at the node for different points in time.

2. The method described in claim 1, wherein the predicted operation variables further comprise a value for a weather condition.

3. The method described in claims 1 or 2, wherein the operation suitability value for one or more field nodes is displayed in a table, graph, or map.

4. The method described in claims 1 or 2, wherein an operation variable value for one or more field nodes is displayed in a table, graph, or map.

5. A method of predicting suitability for performance a remote sensing operation at a field node, the method comprising steps of:
   accessing predicted values for operation variables at the node for different points in time, wherein the predicted operation variables comprise a value for at least one weather condition, crop condition, or soil condition;
   selecting suitability parameters for each predicted operation variable;
   determining values for operation suitability at the node for different points in time using a suitability algorithm adapted to calculate suitability values by comparing predicted operation variable values against the corresponding suitability parameters;
   displaying values determined for remote sensing operation suitability at the node for different points in time.

6. The method described in claim 5, wherein the operation suitability value for one or more field nodes is displayed in a table, graph, or map.

7. The method described in claim 5, wherein an operation variable value for one or more field nodes is displayed in a table, graph, or map.

8. A method of predicting suitability for performance a remote sensing operation at a field node, the method comprising steps of:
   accessing predicted values for operation variables at the node for different points in time, wherein the predicted operation variables comprise a value a weather condition, and a value for at least one crop condition or soil condition;
   selecting suitability parameters for each predicted operation variable;
   determining values for operation suitability at the node for different points in time using a suitability algorithm adapted to calculate suitability values by comparing predicted operation variable values against the corresponding suitability parameters;
   displaying values determined for remote sensing operation suitability at the node for different points in time.

9. The method described in claim 8, wherein the operation suitability value for one or more field nodes is displayed in a table, graph, or map.

10. The method described in claim 9, wherein an operation variable value for one or more field nodes is displayed in a table, graph, or map.

* * * * *